United States Patent [19]

Takizawa et al.

[11] Patent Number: 5,194,994
[45] Date of Patent: Mar. 16, 1993

[54] MIRROR INSTALLATION IN AN OPTICAL DEVICE

[75] Inventors: Yasuo Takizawa, Saitama; Shinyu Ikeda, Tokyo; Masataka Nishikyama, Tokyo; Takaaki Yoshinari, Tokyo; Masakuni Suwashita, Tokyo, all of Japan

[73] Assignee: Asahi Kogaku Kogyo Kabushiki Kaisha, Tokyo, Japan

[21] Appl. No.: 755,012

[22] Filed: Sep. 4, 1991

[30] Foreign Application Priority Data

Sep. 10, 1990 [JP] Japan ............................ 2-95484[U]

[51] Int. Cl.⁵ .............................................. G02B 26/10
[52] U.S. Cl. ...................................... 359/871; 359/218
[58] Field of Search ............... 359/871, 198, 199, 213, 359/214, 215, 216, 217, 218–219, 896

[56] References Cited

U.S. PATENT DOCUMENTS

| | | | |
|---|---|---|---|
| 3,814,507 | 6/1974 | Osborn | 359/871 |
| 4,420,223 | 12/1983 | Watanabe | 359/871 |
| 4,717,223 | 1/1988 | Ishida | 359/218 |
| 4,750,826 | 6/1988 | Maan | 359/871 |
| 4,807,592 | 2/1989 | Trihey | 359/871 |
| 4,869,582 | 9/1989 | Nakajima | 359/218 |
| 5,002,366 | 3/1991 | Okazaki | 359/896 |
| 5,005,947 | 4/1991 | Sibilo | 359/871 |

Primary Examiner—Eugene R. Laroche
Assistant Examiner—A. Zurabian
Attorney, Agent, or Firm—Kane, Dalsimer, Sullivan, Kurucz, Levy, Eisele and Richard

[57] ABSTRACT

Structure and method for mirror installation in an optical device such as a laser beam scanning device. An installation reference surface and a support surface are formed to be faced to but spaced apart from each other. The mirror is installed between the above two surfaces in such a manner that the reflection surface of the mirror contacts the installation reference surface. An elastic element is inserted and press-fitted between the rear surface of the mirror and the support surface so as to push the mirror against the installation reference surface. Thus, the mirror is stably held between the installation reference surface and the support surface with accurately positioning the reflecting surface of the mirror.

17 Claims, 4 Drawing Sheets

F I G. 2
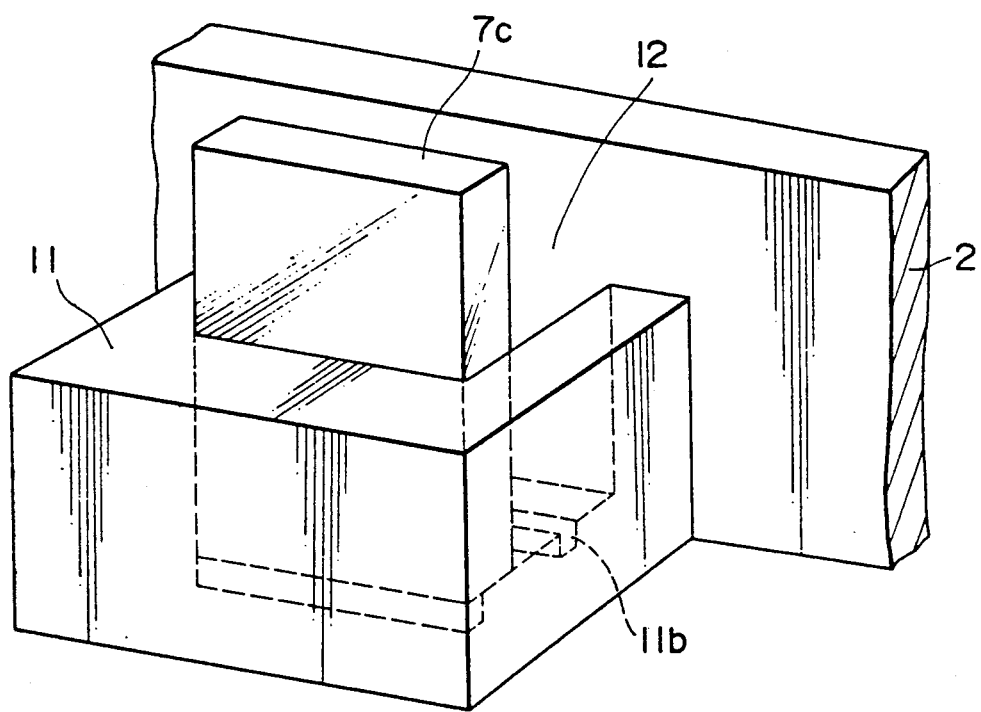

MIRROR INSTALLATION IN AN OPTICAL DEVICE

BACKGROUND OF THE INVENTION

The present invention relates to a mirror installation in an optical device, and more particularly to the installation structure and the installation method of a reflection mirror in a light scanning device.

In the prior arts, one of well known is a laser beam scanning device employed in, for instance, a laser printer. In the laser scanning device, a deflecting means is provided for scanning a predetermined area with a laser beam which is emitted, for example, from a fixed semiconductor laser.

The deflecting means has at least one deflecting surface which is perpendicular to a light passage of the laser beam emitted from the laser. The deflecting means is controlled to change an angle of its deflection surface with respect to the emitted laser beam so that a relative reflection angle against the emitted laser beam can be continuously changed.

In the laser printer employing the above scanning device, it is necessary to synchronize the modulation of the laser beam with its scanning operation, and so a photo-sensor is usually arranged at an edge zone of the beam scanning area to take timing of the beam modulation.

The photo-sensor is, however, often located at a position which is out of the beam scanning area due to requirements for effective arrangements of related parts and so on, and a reflecting mirror is instead placed at the edge zone of the beam scanning area for directing the beam to the out-placed photo-sensor.

The mirror has conventionally been installed in the device, for example, by means of a leaf spring 9 and a tapping screw 10 as illustrated in FIG. 7, wherein reference numerals 7c and 8 indicate a reflecting mirror and a mounting wall formed on a housing case 2,. respectively.

With this installation, the rear side surface of the reflection mirror 7c first abuts the installation wall 8 and then urged and fixed thereto by the leaf spring 9 and the tapping screw 10. Accordingly, installing work is troublesome and time-consuming. Further, mirror surface would incline due to roughness of the rear surface of the mirror and/or to uneven thickness of the mirror, which influences timing of the modulation of the laser beam.

SUMMARY OF THE INVENTION

It is therefore an object of the present invention to provide improved structure and method for installation of a mirror in an optical device, capable of avoiding the aforementioned disadvantages, and of guaranteeing easy and quick nevertheless accurate installation of a mirror even though the rear surface of the mirror is roughly treated and/or if the thickness of the mirror is uneven.

For the above purpose, in accordance with the present invention, there is provided a mirror installation structure comprising: a front installation wall provided at the predetermined position, said first installation wall having a front surface facing toward an optical path of said scanning device and a reverse surface formed opposite side of the front surface, said reverse surface being finished as an installation reference surface; a rear support wall provided to be spaced from the installation reference surface and to face with each other, said mirror being installed in such a manner that a reflection surface of the mirror is located to contact with the installation reference surface of the front installation wall; and an elastic element being inserted and press-fitted between the mirror and the rear support wall so as to securely hold and bias the mirror toward the installation reference surface.

The elastic element may be constituted as having a plurality of spring pieces, each of which is formed by cutting a part of the metallic plate into a U-shaped configuration and bending the cut part outward.

The elastic element may be constituted as additionally having at least one bent flange on the top portion of the elastic element for preventing the mirror from falling out.

The elastic element may alternately be constituted by being folded to be approximately U-shaped configuration so as to be press-fitted between the mirror and the rear support wall.

Further provided, according to this invention, is a method for installing a mirror in an optical device, comprising the steps of: forming an installation reference surface and a support surface, said installation reference surface and said support surface being faced to but spaced apart from each other; placing said mirror in such a manner that the reflection surface of said mirror is contacted said installation reference surface; and inserting and press-fitting an elastic element between the rear surface of said mirror and said support surface so as to push the mirror against the installation reference surface, whereby said mirror is stably held between the installation reference surface and the support surface with accurately positioning the reflecting surface of the mirror.

The above, and other objects, features and advantages of the present invention will become apparent from the following detail description which is to be read in conjunction with the accompany drawings.

DESCRIPTION OF THE ACCOMPANYING DRAWINGS

FIG. 2 is a perspective view showing the installation structure for a reflection mirror shown in FIG. 1;

DESCRIPTION OF THE EMBODIMENTS

Hereinafter, the embodiments of the present invention are explained in detail by referring to accompanying drawings.

Figure 1:
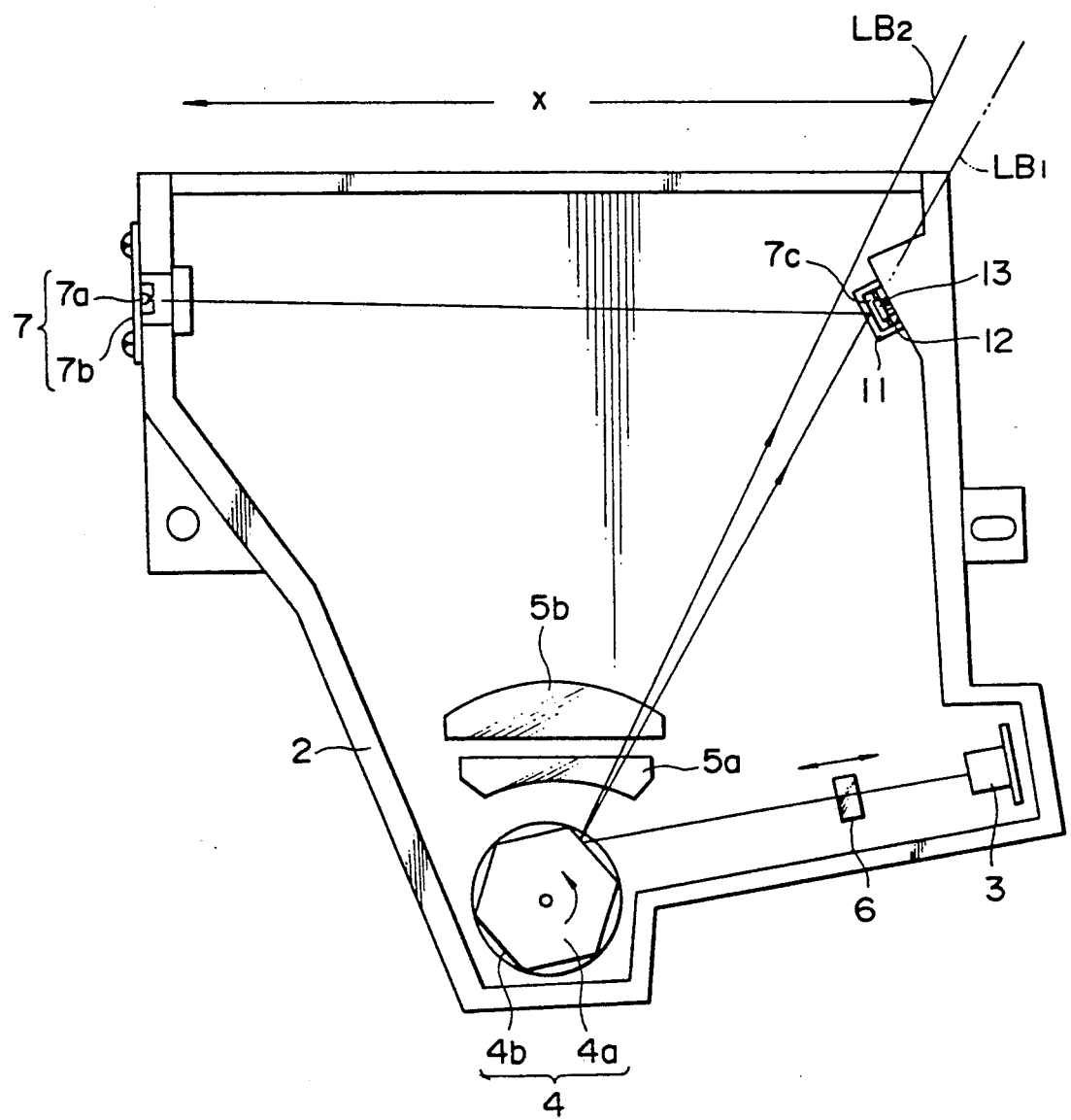
FIG. 1 is a plan view showing a laser beam scanning device embodying the present invention.

FIG. 1 is a plan view showing principal parts of a laser beam scanning device embodying the invention, which is applied, for example, to a laser printer.

The illustrated laser beam scanning device comprises a housing case 2 and various optical components mounted thereon. The optical components are a laser unit 3 for emitting laser beam carrying optical image information, a light deflection means 4 for deflecting the emitted laser beam, a pair of fθ lenses 5a and 5b for making constant a scanning speed of the laser beam on an image-forming surface X, a correction lens 6 for correcting astigmatism and so on caused by manufacturing errors of the fθ lenses 5a and 5b and so on, a reflecting mirror 7c for reflecting the laser beam, and a horizontal-sync signal generating unit 7 including a photo-sensor 7a which receives the beam reflected by the reflecting mirror 7c.

The laser unit 3 is constituted, not shown but as well known in the art, by a semi-conductor laser which is electrically ON/OFF controlled, a collimator lens for converting a light generated by the semi-conductor lens into a beam-shaped parallel luminous flux (i.e., laser beam), and so on.

The light deflection means 4 is constituted by a polygonal mirror 4a and a motor 4b for rotating the polygonal mirror 4a at high revolutional speed.

The correction lens 6 comprises a cylindrical lens and the like, and arranged between the laser unit 3 and the light deflecting means 4. The position of the correction lens 6 is adjusted along the optical axis indicated by the arrow in FIG. 1 so as to correct astigmatism and so on of the fθ lenses 5a and 5b.

The horizontal-sync signal generating unit 7 comprises, besides the photo-sensor 7a, a signal output member 7b which generates and outputs horizontal-sync signal when the beam reflected by the reflection mirror 7c incidents upon the photo-sensor 7a. The horizontal-sync signal output from the signal output member 7b is transmitted to a controller, not shown, which regulates ON/OFF operation of the laser unit 3.

Figure 3:
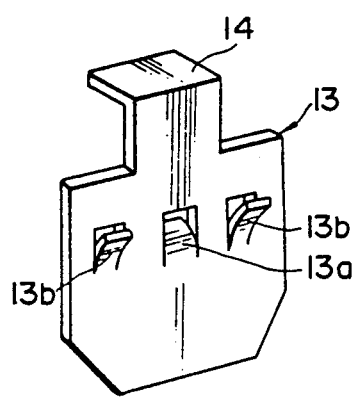
FIG. 3 is a perspective view showing an elastic element.
Figure 4:
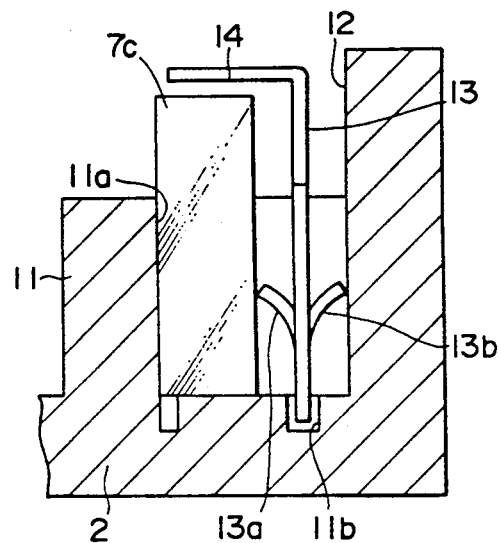
FIG. 4 is a vertical-sectional view showing the reflection mirror installed with the elastic element illustrated in FIG. 3.

The reflection mirror 7c is installed in the device as illustrated in FIG. 1 and more particularly in FIGS. 2 through 4.

That is, near one end of the beam scanning area, provided is a front installation wall 11 which is horizontally protruded from a rear support wall 12 formed on the housing case 2.

The front installation wall 11 has a generally U-shaped figure, and is provided with a front-reverse surface 11a which is finished as an installation reference surface. The installation reference surface is accurately formed to stand vertically but to oblique at a predetermined angle with respect to the laser beam LB deflected by the deflection means 4 (the polygonal mirror 4a).

Behind the front installation wall 11, the reflection mirror 7c is installed in such a manner that a front reflection surface of the reflection mirror 7c contacts the front-reverse surface 11a of the front installation wall 11.

The height of the front installation wall 11 is designed to be lower than that of the reflection mirror 7c, so that the reflection mirror 7c protrudes above the front installation wall 11. Thus, the deflected laser beam LB can be reflected on the front-reflection surface of the mirror 7c protruding above the front installation wall 11.

When the reflection mirror 7c is installed in the foregoing manner, a reverse surface of the reflection mirror 7c is located to face to the rear support wall 12. Then, an elastic element 13 as illustrated in FIG. 3 is inserted and press-fitted between the rear support wall 12 and the reverse surface of the reflection mirror 7c, as illustrated in FIG. 4. The elastic element 13 pushes the reflection mirror 7c toward the installation reference surface (the front-reverse surface 11a) on the front installation wall 11. Thus, the reflection mirror 7c can be firmly held between the front installation wall 11 and the rear support wall 12 without falling out.

The elastic element 13 is made of metal plate and the like, and has a plurality of spring pieces 13a, 13b, each of which is formed by cutting a part of the metal plate in a U-shaped configuration and bending the cut part outward. One spring piece 13a is formed at middle of the metal plate and bent toward one side. A pair of spring pieces 13b, 13b are formed close to the spring piece 13a so as to place the spring piece 13a between these spring pieces 13b, 13b. Furthermore, there is provided a stopper piece 14 on a top portion of the elastic element 13 for preventing the reflection mirror 7c from falling out. The stopper piece 14 is formed to be perpendicular to the remaining part of the metal plate and to overlap with the upper surface of the reflection mirror 7c when it is inserted and press-fitted between the reflection mirror 7c and the rear support wall 12. The elastic element 13 is inserted until the bottom portion 13e of the elastic element 13 reaches to a recessed portion 11b formed on the housing case 2.

Thus, the front-reflection surface of the reflection mirror 7c can be pressed to contact the installation reference surface (i.e., the front-reverse surface 11a) of the front installation wall 11 by virtue of elastic force given by the plurality of spring pieces 13a, 13b of the elastic element 13.

With the above arrangement, the installation of the reflection mirror 7c is completed with only one step of press-fitting the elastic element 13.

In addition, as the placement of the front-reflection surface of the reflection mirror 7c is accurately regulated by the front-reverse surface 11a (i.e., the installation reference surface) of the front installation wall 11, the beam detection is not affected by the manufacturing dispersions of the reverse surface of the reflection mirror 7c and/or the rear support wall 12.

Figure 5:
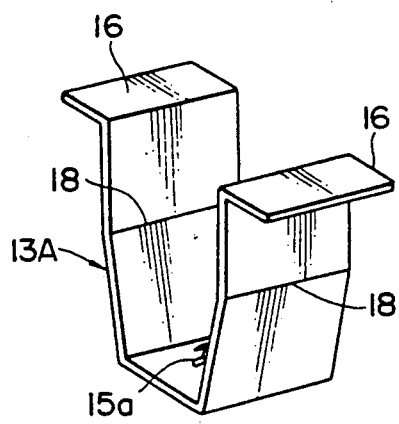
FIG. 5 is a perspective view showing another elastic element.
Figure 6:
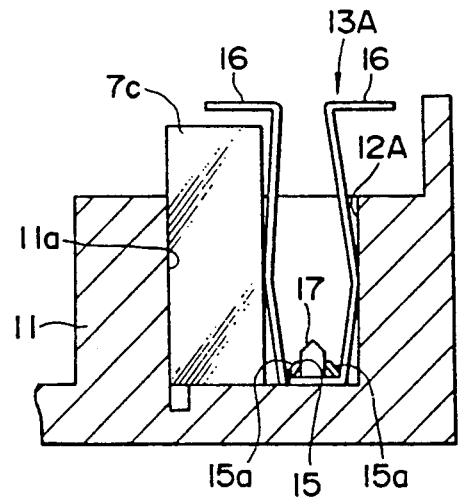
FIG. 6 is a vertical-sectional view showing the reflection mirror installed with another elastic element illustrated in FIG. 5.
Figure 7:
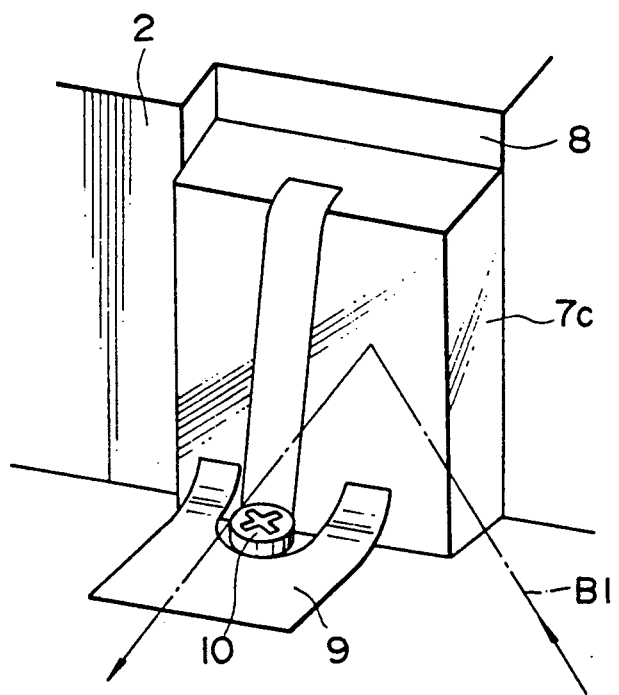
FIG. 7 is a perspective view showing one example of the conventional installation structures for a reflection mirror.

FIGS. 5 and 6 show another embodiment of the present invention.

In this embodiment, the elastic element 13A is formed, as illustrated in FIG. 5, by being folded to be approximately U-shaped configuration so as to fit the clearance between the reflection mirror 7c and the rear support wall 12A. The elastic element 13A has a pair of middle portions 18, 18, each protruding outward in opposite direction so as to engage with the front-reverse surface 11a of the front installation wall 11 and the rear support wall 12A.

Further provided is a hole 15 surrounded by a plurality of rising cut pieces 15a, 15a at the bottom portion of the elastic element 13A. At the top portion of the elastic element 13A, provided are a pair of bent-flanges 16, 16 for preventing the reflection mirror 7c from falling out.

When the reflection mirror 7c is installed, the elastic element 13A is inserted and press-fitted between the reflection mirror 7c and the rear support wall 12A until the hole 15 is engaged with a pin 17 formed on the housing case 2, as illustrated in FIG. 6.

With the above arrangement, the reflection mirror 7c is firmly held by the elastic element 13A to contact the installation reference surface (i.e., the front-reverse surface 11a of the front installation wall 11, as is the same as the first embodiment.

As this invention may be embodied in several forms without departing from the spirit of essential characteristics thereof, the present embodiment is therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

The present disclosure relates to subject matters contained in Japanese Utility Model Application No. HEI 2-95484 filed on Sep. 10, 1990, which is expressly incorporated herein by reference in its entirety.

What is claimed is:

1. A mirror installation structure in an optical device comprising:
    a mirror;
    a front installation wall provided at a predetermined position, said front installation wall having a front surface facing an optical path of said optical device and a reverse surface formed opposite to the front surface, said reverse surface being finished as an installation reference surface;
    a rear support wall provided spaced apart from and facing to the installation reference surface, said mirror being installed in such a manner that a reflection surface of the mirror is located to contact said installation reference surface of said front installation wall; and
    an elastic element inserted and press-fitted between the mirror and the rear support wall so as to securely hold and bias the mirror in the direction of said optical path toward said installation reference surface.

2. The mirror installation structure according to claim 1, wherein said front installation wall has a U-shaped cross section.

3. The mirror installation structure according to claim 1, which further comprises a light deflection means and a photo-sensing means; and wherein said installation reference surface is accurately formed to oblique at a predetermined angle with respect to light deflected by the deflection means so that the reflected light can be directed to said photo-sensing element.

4. The mirror installation structure according to claim 1, wherein the height of said front installation wall is formed to be lower than that of the mirror so that the light can be reflected by the mirror which protrudes above the front installation wall.

5. The mirror installation structure according to claim 1, wherein said elastic element is made of metal plate.

6. The mirror installation structure according to claim 5, wherein said elastic element has a plurality of spring pieces, each of which is formed by cutting a part of the metallic plate into a U-shaped configuration and bending the cut part outward.

7. The mirror installation structure according to claim 6, wherein one of said spring pieces is bent toward one side of the metal plate, and the other of said spring pieces is bent toward the other side of the metal plate.

8. The mirror installation structure according to claim 6, wherein one of said spring pieces is formed at middle of the metal plate and bent toward one side, and a pair of spring pieces are formed close to said one spring piece so as to place said one spring piece between these spring pieces.

9. The mirror installation structure according to claim 5, wherein said elastic element has at least one bent flange on the top portion of the elastic element for preventing the mirror from falling out.

10. The mirror installation structure according to claim 9, wherein said flange is formed to overlap with the upper surface of the mirror when the elastic element is inserted and press-fitted between the mirror and the rear support wall.

11. The mirror installation structure according to claim 5, wherein said elastic element is formed by being folded to be approximately U-shaped configuration so as to be press-fitted between the mirror and the rear support wall.

12. The mirror installation structure according to claim 11, wherein said elastic element has a pair of bent portions, each protruding outward in opposite direction so as to be engaged with the mirror and the rear support wall, respectively.

13. The mirror installation structure according to claim 12, wherein said elastic element has a hole surrounded by a plurality of rising cut pieces at the bottom portion thereof.

14. The mirror installation structure according to claim 12, wherein said elastic element has a pair of bent-flanges at the top portion of the elastic element for preventing the mirror from falling out.

15. A method for installing a mirror in an optical device, comprising the steps of:
    forming an installation reference surface and a support surface, said installation reference surface and said support surface being spaced apart from and facing each other;
    positioning said mirror between said support surface and installation reference surface in such a manner that a reflection surface of said mirror contacts said installation reference surface; and
    inserting and press-fitting an elastic element between a rear surface of said mirror and said support surface so as to urge the mirror against the installation reference surface, whereby said mirror is stably held between the installation reference surface and the support surface while accurately positioning the reflecting surface of the mirror.

16. The method according to claim 15, wherein a recess is formed between the installation reference surface and the support surface; and wherein said elastic element is inserted and press-fitted between the reflection mirror and the support surface until the bottom of the elastic element reaches to said recess.

17. The method according to claim 15, wherein said elastic element is provided with a hole at the bottom thereof while a pin is planted on the bottom of the space between the mirror and the support surface; and wherein the elastic element is inserted until said hole is engaged with said pin.

* * * * *